(12) United States Patent
Han et al.

(10) Patent No.: US 11,417,880 B2
(45) Date of Patent: Aug. 16, 2022

(54) METHOD FOR PREPARING IRON NITRATE OXYHYDROXIDE, CATHODE CONTAINING IRON NITRATE OXYHYDROXIDE PREPARED THEREBY FOR LITHIUM SECONDARY BATTERY, AND LITHIUM SECONDARY BATTERY COMPRISING SAME

(71) Applicant: LG CHEM, LTD., Seoul (KR)

(72) Inventors: Suenghoon Han, Daejeon (KR); Seongji Ye, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 225 days.

(21) Appl. No.: 16/771,039

(22) PCT Filed: Jun. 25, 2019

(86) PCT No.: PCT/KR2019/007657
§ 371 (c)(1),
(2) Date: Jun. 9, 2020

(87) PCT Pub. No.: WO2020/013482
PCT Pub. Date: Jan. 16, 2020

(65) Prior Publication Data
US 2021/0175501 A1 Jun. 10, 2021

(30) Foreign Application Priority Data
Jul. 10, 2018 (KR) .................. 10-2018-0079814
Jul. 16, 2018 (KR) .................. 10-2018-0082531

(51) Int. Cl.
*H01M 4/52* (2010.01)
*C01G 49/00* (2006.01)
(Continued)

(52) U.S. Cl.
CPC ............ *H01M 4/523* (2013.01); *C01G 49/00* (2013.01); *H01M 4/364* (2013.01); *H01M 4/38* (2013.01);
(Continued)

(58) Field of Classification Search
None
See application file for complete search history.

(56) References Cited

U.S. PATENT DOCUMENTS

2014/0361226 A1  12/2014  Takada et al.

FOREIGN PATENT DOCUMENTS

CN  104577080 A  4/2015
CN  106082351 B  4/2018
(Continued)

OTHER PUBLICATIONS

Silva et al., "Magnetic and Structural Properties of Iron Oxyhydroxynitrate Nanoparticles", NanoSpain2008, Apr. 14-18, 2008, pp. 1-2. (Year: 2008).*
(Continued)

*Primary Examiner* — Daniel S Gatewood
(74) *Attorney, Agent, or Firm* — Birch, Stewart, Kolasch & Birch, LLP

(57) ABSTRACT

A method for preparing an iron oxyhydroxynitrate, a positive electrode for a lithium secondary battery including the iron oxyhydroxynitrate prepared therefrom, and a lithium secondary battery including the same. The positive electrode for the lithium secondary battery containing the iron oxyhydroxynitrate includes the iron oxyhydroxynitrate represented by the following Formula 1:

$FeO(NO_3)_x(OH)_{1-x}$, wherein $0<x<1$. [Formula 1]

13 Claims, 7 Drawing Sheets

(51) Int. Cl.
　　　*H01M 4/36*　　　　(2006.01)
　　　*H01M 4/38*　　　　(2006.01)
　　　*H01M 4/583*　　　(2010.01)
　　　*H01M 10/0525*　　(2010.01)
　　　*H01M 4/02*　　　　(2006.01)

(52) U.S. Cl.
　　　CPC ....... *H01M 4/583* (2013.01); *H01M 10/0525* (2013.01); *C01P 2002/72* (2013.01); *C01P 2002/74* (2013.01); *C01P 2004/64* (2013.01); *H01M 2004/027* (2013.01); *H01M 2004/028* (2013.01)

(56) References Cited

FOREIGN PATENT DOCUMENTS

| | | |
|---|---|---|
| JP | 2002-248348 A | 9/2002 |
| JP | 2003-135579 A | 5/2003 |
| JP | 2005-281128 A | 10/2005 |
| JP | 2006-107763 A | 4/2006 |
| JP | 2007-200774 A | 8/2007 |
| JP | 2012-94361 A | 5/2012 |
| KR | 10-0270077 B1 | 10/2000 |
| KR | 10-2006-0054515 A | 5/2006 |
| KR | 10-2014-0116397 A | 10/2014 |
| KR | 10-2016-0121833 A | 10/2016 |
| KR | 10-2017-0001374 A | 1/2017 |
| KR | 10-2017-0067081 A | 6/2017 |
| KR | 10-2017-0082280 A | 7/2017 |
| WO | WO 2017/109014 A1 | 6/2017 |

OTHER PUBLICATIONS

Bourlinos et al., "One-pot Borohydride Synthesis of Magnetically Modified Lepidocrocite", Chemistry Letters, vol. 34, No. 5, 2005, pp. 666-667.

International Search Report issued in PCT/KR2019/007657 (PCT/ISA/210), dated Oct. 1, 2019.

Jia et al., "Facile one-pot synthesis of lepidocrocite (γ-FeOOH) nanoflakes for water treatment", New J. Chem., vol. 37, 2013, pp. 2551-2556.

Schwertmann et al., "Brief Communication A New Iron(III) Oxyhydroxynitrate", Journal of Solid State Chemistry 126, Article No. 0346, 1996, p. 336.

Silva et al., "Magnetic and Structural Properties of Iron Oxyhydroxynitrate Nanoparticles", NanoSpain2008, Apr. 14-18, 2008, pp. 1-2.

Silva et al., "Magnetic behavior of iron (III) oxyhydroxy nanoparticles in organic-inorganic hybrid matrices", Journal of Magnetism and Magnetic Materials, 290-291, 2005, pp. 962-965.

* cited by examiner

METHOD FOR PREPARING IRON NITRATE OXYHYDROXIDE, CATHODE CONTAINING IRON NITRATE OXYHYDROXIDE PREPARED THEREBY FOR LITHIUM SECONDARY BATTERY, AND LITHIUM SECONDARY BATTERY COMPRISING SAME

TECHNICAL FIELD

This application claims the benefits of priorities based on Korean Patent Application No. 10-2018-0079814, filed on Jul. 10, 2018 and Korean Patent Application No. 10-2018-0082531, filed on Jul. 16, 2018, the entire contents of which are incorporated herein by reference.

The present invention relates to a method for preparing iron oxyhydroxynitrate, a positive electrode for a lithium secondary battery comprising iron oxyhydroxynitrate prepared therefrom as a positive electrode additive, and a lithium secondary battery with improved discharging characteristic comprising the same.

BACKGROUND ART

Secondary batteries have become important electronic components for portable electronic devices since the 1990s as an electric storage device capable of continuous charging and discharging unlike the primary battery which can only be discharged once. In particular, since a lithium ion secondary battery was commercialized by Sony in Japan in 1992, it has led the information age as a key component of portable electronic devices such as smart phones, digital cameras, and notebook computers.

In recent years, lithium ion secondary batteries are rapidly growing in demand from electric sources of cleaner and power tool, medium-sized batteries to be used in fields such as electric bicycles and electric scooters, to large capacity batteries for applications such as electric vehicle (EV), hybrid electric vehicle (HEV), plug-in hybrid electric vehicle (PHEV), and various robots and electric power storage systems (ESS), while further widening application area.

However, the lithium secondary battery, which has the best characteristics among the secondary batteries known to date, also has several problems in being actively used in transportation vehicles such as electric vehicles and PHEVs, and among them, the biggest problem is the limit in capacity.

The lithium secondary battery basically consists of materials such as positive electrode, electrolyte, and negative electrode. Among them, since the capacity of the battery is determined by the positive and negative electrode materials, the lithium ion secondary battery is limited in capacity due to the material limitations of positive and negative electrodes. In particular, since the secondary battery used in applications such as electric vehicles and PHEVs should be able to last as long as possible after charging once, the discharging capacity of the secondary battery is very important. One of the biggest constraints to the sale of electric vehicles is that the distance that can be traveled after charging once is much shorter than those of ordinary gasoline engine vehicles.

The limitation of the capacity of such a lithium secondary battery is difficult to be completely solved due to the structure and material constraints of the lithium secondary battery despite of much effort. Therefore, in order to fundamentally solve the problem of the capacity of the lithium secondary battery, it is required to develop a new concept secondary battery that goes beyond the existing secondary battery concept.

The lithium-sulfur secondary battery is a new high capacity and low-cost battery system which goes beyond capacity limits determined by the intercalation/deintercalation reaction of lithium ions to the layered structure of the metal oxide and graphite which is the basic principle of existing lithium ion secondary battery, and which can lead to replacement of transition metals and cost savings.

The lithium-sulfur secondary battery has a theoretical capacity of 1,675 mAh/g derived from a conversion reaction of lithium ion and sulfur ($S_8+16Li^++16e^-\rightarrow 8Li_2S$) in the positive electrode and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the energy theoretical energy density of 400 Wh/kg of commercially available lithium secondary battery ($LiCoO_2$/graphite) which uses layered metal oxides and graphite.

After the lithium-sulfur secondary battery was found to be able to dramatically improve battery performance through the formation of nanocomposites around 2010, the lithium-sulfur secondary battery is attracting attention as a new high capacity, eco-friendly, low-cost lithium secondary battery and is currently being studied intensively around the world as a next-generation battery system.

One of the main problems of the lithium-sulfur secondary battery revealed to date is that since sulfur has an electrical conductivity of about $5.0\times 10^{-14}$ S/cm and thus is close to nonconductor, electrochemical reaction at the electrode is not easy, and due to the very large overvoltage, the actual discharging capacity and voltage are far below the theoretical value. Early researchers tried to improve the performance by methods such as mechanical ball milling of sulfur and carbon or surface coating with carbon, but there was no substantial effect.

In order to effectively solve the problem of limiting the electrochemical reaction by electrical conductivity, it is necessary to reduce the particle size to a size of several tens of nanometers or less and to conduct surface treatment with a conductive material, as in the example of $LiFePO_4$ (electrical conductivity: $10^{-9}$ to $10^{-10}$ S/cm) which is one of the other positive electrode active materials, and for this purpose, various chemical (melt impregnation into nano-sized porous carbon nanostructures or metal oxide structures) and physical (high energy ball milling) methods and the like have been reported.

Another major problem associated with the lithium-sulfur secondary battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8\rightarrow Li_2S_8\rightarrow (Li_2S_6)\rightarrow Li_2S_4\rightarrow Li_2S_2\rightarrow Li_2S$ or the like, and among them, $Li_2S_8$ and $Li_2S_4$ (lithium polysulfide), which are long chains of sulfur, are easily dissolved in a general electrolyte used in a lithium ion battery. When this reaction is occurred, not only the reversible positive electrode capacity is greatly reduced but also the dissolved lithium polysulfide diffuses into the negative electrode and causes various side reactions.

The lithium polysulfide causes a shuttle reaction especially during the charging process, and as a result, the charging capacity is continuously increased, and the charging/discharging efficiency is rapidly deteriorated. Recently, in order to solve such a problem, various methods have been proposed, which can be divided broadly into a method of improving the electrolyte, a method of improving the surface of a negative electrode, a method of improving the properties of a positive electrode and the like.

The method of improving the electrolyte is a method to suppress the shuttle reaction as much as possible by using new electrolytes, such as a functional liquid electrolyte, a polymer electrolyte, and an ionic liquid, which have a novel composition, and thus controlling the dissolution of the polysulfide into the electrolyte or controlling the dispersion rate to the negative electrode through adjustment of the viscosity and the like.

Studies on controlling the shuttle reaction by improving the characteristics of SEI formed on the surface of the negative electrode have been actively carried out. Typically, there is a method of adding an electrolyte additive such as $LiNO_3$ to form an oxide film of $Li_xNO_y$ or $Li_xSO_y$ on the surface of a lithium negative electrode, a method of forming a thick functional SEI layer on the surface of lithium metal, or the like.

Finally, as a method of improving the properties of a positive electrode, there is a method of forming a coating layer on the surfaces of positive electrode particles so as to prevent dissolution of the polysulfide, adding a porous material capable of catching the dissolved polysulfide or the like. Typically, a method of coating the surface of a positive electrode structure containing a sulfur particle with a conductive polymer, a method of coating the surface of a positive electrode structure with a metal oxide through which lithium ions are transferred, a method of adding a porous metal oxide, which has a large specific surface area and a large pore size and is capable of absorbing a large amount of the lithium polysulfide, to a positive electrode, a method of attaching a functional group capable of adsorbing the lithium polysulfide to the surface of a carbon structure, a method of wrapping sulfur particles by using graphene, graphene oxide or the like have been proposed.

Although such efforts are under way, these methods are not only somewhat complicated, but also have a problem that the amount of sulfur that can be added, which is an active material, is limited. Therefore, it is necessary to develop new technologies to solve these problems complexly and to improve the performance of lithium secondary battery.

DISCLOSURE

Technical Problem

As a result of various studies to solve the above problems, the inventors of the present invention have confirmed that iron oxyhydroxynitrate can be selectively produced with high purity by drying $Fe(NO_3)_3 \cdot 9H_2O$ as a raw material of iron oxyhydroxynitrate, while controlling the kind of solvent, drying temperature, and duration of the process.

Therefore, it is an object of the present invention to provide a method for preparing iron oxyhydroxynitrate with high purity through a simple process.

In addition, in order to solve the problem of leaching of the lithium polysulfide on the positive electrode side of the lithium secondary battery and to inhibit the side reaction with the electrolyte solution, the inventors of the present invention have introduced specific iron oxyhydroxynitrate into the positive electrode of the lithium secondary battery, and as a result, it has been confirmed that the battery performance of the lithium secondary battery can be improved by solving the above problem, thereby completing the present invention.

Therefore, it is another object of the present invention to provide a positive electrode additive for the lithium secondary battery capable of solving the problem caused by the lithium polysulfide.

It is still another object of the present invention to provide a lithium secondary battery comprising the positive electrode and thus having improved lifetime characteristic of the battery.

Technical Solution

In order to achieve the above objects, the present invention provides a method for preparing iron oxyhydroxynitrate comprising the steps of: (1) dissolving $Fe(NO_3)_3 \cdot 9H_2O$ in the mixed solvent of an aqueous solvent and an organic solvent to prepare a $Fe(NO_3)_3 \cdot 9H_2O$ solution; and (2) drying the $Fe(NO_3)_3 \cdot 9H_2O$ solution to obtain a compound represented by the following Formula 1:

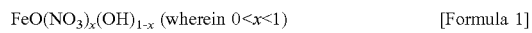
$FeO(NO_3)_x(OH)_{1-x}$ (wherein $0<x<1$) [Formula 1]

In addition, the present invention provides a positive electrode for a lithium secondary battery comprising iron oxyhydroxynitrate represented by the following Formula 1:

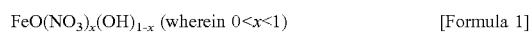
$FeO(NO_3)_x(OH)_{1-x}$ (wherein $0<x<1$) [Formula 1]

In addition, the present invention relates to a lithium secondary battery comprising the positive electrode for the lithium secondary battery; a negative electrode; a separator interposed therebetween; and an electrolyte.

Advantageous Effects

According to the method for preparing iron oxyhydroxynitrate according to the present invention, iron oxyhydroxynitrate with high purity can be prepared by a simple process which comprises dissolving $Fe(NO_3)_3 \cdot 9H_2O$ in a selective solvent to prepare a $Fe(NO_3)_3 \cdot 9H_2O$ solution and drying it.

In addition, if iron oxyhydroxynitrate according to the present invention is applied to the positive electrode of the lithium secondary battery, it is possible to increase the reactivity of the positive electrode of the lithium secondary battery and suppress the side reaction with the electrolyte solution by adsorbing the lithium polysulfide generated during charging and discharging of the lithium secondary battery.

In addition, the lithium secondary battery comprising the positive electrode containing iron oxyhydroxynitrate is capable of realizing a battery with high capacity because the capacity of sulfur is not lowered, and stably applying sulfur with high loading, thereby also improving the stability of the battery because the overvoltage of the battery is improved and there is no problem such as the short circuit and heat generation of the battery. In addition, the lithium secondary battery has an advantage that the charging and discharging efficiency of the battery is high and the lifetime characteristics are improved.

BEST MODE

Figure 1:
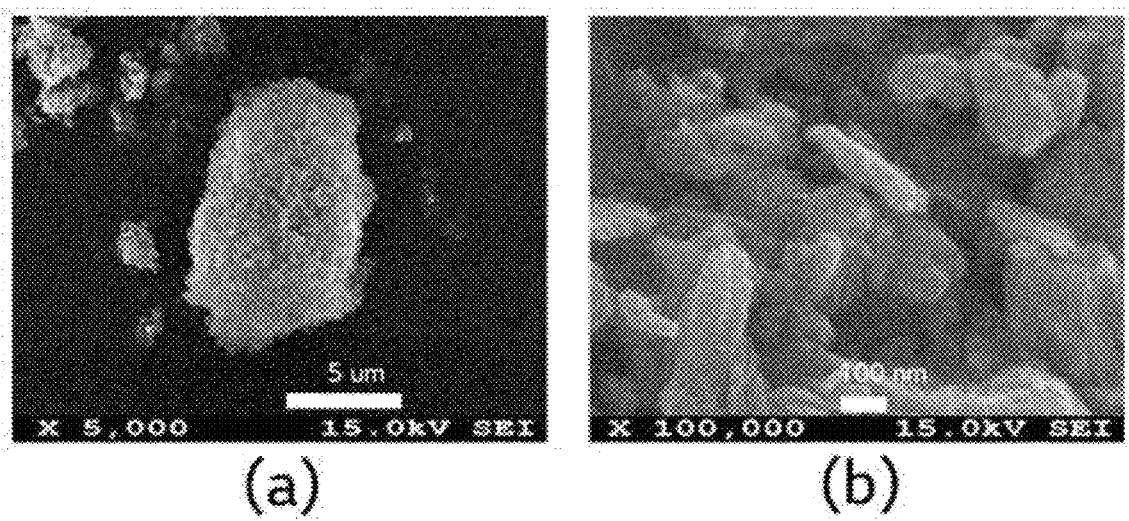
FIG. 1 shows a scanning electron microscope (SEM) image of iron oxyhydroxynitrate ($FeO(NO_3)_x(OH)_{1-x}$) (wherein $0.5 \leq x < 1$) according to Example 1 of the present invention.

Hereinafter, the present invention will be described in detail with reference to the accompanying drawings so that those skilled in the art can easily carry out the present invention. However, the present invention can be embodied in various different forms, and is not limited thereto.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

The lithium secondary battery is manufactured by using a material capable of intercalating/deintercalating lithium ions as a negative electrode and a positive electrode, and filling an organic electrolyte solution or a polymer electrolyte solution between the negative electrode and the positive electrode, and means an electrochemical device that generates electrical energy by the oxidation/reduction reaction when lithium ions are intercalated and deintercalated at positive and negative electrodes. According to an embodiment of the present invention, the lithium secondary battery may be a lithium-sulfur battery comprising "sulfur" as an electrode active material of the positive electrode.

Method for Preparing Iron Oxyhydroxynitrate

The method for preparing iron oxyhydroxynitrate according to the present invention comprises the steps of: (1) dissolving Fe(NO$_3$)$_3$.9H$_2$O in the mixed solvent of an aqueous solvent and an organic solvent to prepare a Fe(NO$_3$)$_3$.9H$_2$O solution; and (2) drying the Fe(NO$_3$)$_3$.9H$_2$O solution to obtain a compound represented by the following Formula 1:

$$FeO(NO_3)_x(OH)_{1-x} \text{ (wherein } 0<x<1\text{)} \quad \text{[Formula 1]}$$

Fe(NO$_3$)$_3$.9H$_2$O is a precursor of the iron oxyhydroxynitrate, which can be dissolved in a mixed solvent to prepare a Fe(NO$_3$)$_3$.9H$_2$O solution. In this case, the mixed solvent may be a mixture of an aqueous solvent and an organic solvent.

The aqueous solvent may be water, preferably double distilled water (DW), or triple distilled deionized water (DIW). The organic solvent may be one selected from the group consisting of methanol, ethanol, n-propanol, isopropanol, ethylene glycol, propylene glycol, and combinations thereof, preferably ethanol.

The aqueous solvent and the organic solvent may be mixed at a weight ratio of 30:70 to 70:30, specifically, a weight ratio of 40:60 to 60:40, preferably a weight ratio of 50:50.

If the ratio of the aqueous solvent exceeds the above range, the iron oxyhydroxynitrate represented by the above Formula 1 may not be produced. Therefore, the aqueous solvent and the organic solvent should be properly mixed in the above range.

The concentration of the Fe(NO$_3$)$_3$.9H$_2$O solution may be 0.5 to 2.5 M, preferably 1.5 to 2.0M.

If the concentration is less than 0.5 M, the evaporation rate of the solution becomes slower and the crystal of the prepared iron oxyhydroxynitrate becomes larger or the preparation yield may be lowered. If the concentration exceeds 2.5 M, the prepared iron oxyhydroxynitrate may be agglomerated and thus the physical properties of iron oxyhydroxynitrate may not be suitable for application as a positive electrode additive for the lithium-sulfur battery.

The present invention comprises a step for preparing iron oxyhydroxynitrate represented by Formula 1 by drying the Fe(NO$_3$)$_3$.9H$_2$O solution prepared in step (1). The 'drying' is performed under a condition of a temperature equal to or higher than a predetermined temperature, and may include a meaning such as 'heat treatment'.

The drying can be carried out at 70 to 90° C., preferably at 75 to 85° C. In addition, the drying may be carried out for 18 to 36 hours, preferably 20 to 30 hours, in the temperature range described above. If the temperature is lower than the above-mentioned temperature or the drying time is short, the moisture of Fe(NO$_3$)$_3$.9H$_2$O, which is a reactant, may remain excessively, and then the moisture may be is subjected to a drying process and non-uniformly evaporated, or reaction residues may remain, so that the iron oxyhydroxynitrate represented by Formula 1 according to the present invention may not be synthesized.

In addition, if the temperature exceeds the above-mentioned range or the drying time is long, after the moisture of the reactant Fe(NO$_3$)$_3$.9H$_2$O is completely evaporated, the oxidation reaction by drying may progress partially. In this case, the irregular oxidation reaction may occur through the drying process, and the size of the generated particles may be increased and the agglomerated form may be expressed, so that the iron oxyhydroxynitrate having the desired physical properties in the present invention may not be synthesized.

For example, when preparing the iron oxyhydroxynitrate according to the present invention, if the aqueous solvent exceeding the above range is used and the drying is carried out at a temperature exceeding the above range (for example, 140 to 160° C.), Fe$_x$O$_3$ (wherein 1.7<x<2.0)

instead of the iron oxyhydroxynitrate represented by the above Formula 1 may be produced. In addition, if the organic solvent exceeding the above range is used and the drying is carried out at a temperature exceeding the above range (for example, 140 to 160° C.), $Fe_2O_3$ instead of the iron oxyhydroxynitrate represented by the above Formula 1 may be partially produced. Therefore, the drying temperature is appropriately adjusted in the above drying temperature range.

The pre-treatment step for drying may be carried out using a convection oven in an environment where sufficient air is introduced.

$Fe(NO_3)_3 \cdot 9H_2O$ generates the substance represented by the above Formula 1 through the drying step.

In the above Formula 1, x may vary depending on the drying time and temperature, and preferably may be $0.5 \leq x < 1$, more preferably $0.7 \leq x < 1$. The lower the value of x in the above Formula 1 is, the lower the stability of the produced iron oxyhydroxynitrate is. In addition, as the temperature in the drying step rises, the hydroxyl (OH) functional groups contained in the iron oxyhydroxynitrate are thermally decomposed and converted to water ($H_2O$), so that the structure of the iron oxyhydroxynitrate can be collapsed. In addition, when it is applied to the lithium secondary battery, it is not preferable because water ($H_2O$) is electrolyzed during the charging/discharging of the battery, and thus hydrogen gas ($H_2(g)$) may be generated.

The particle diameter of the iron oxyhydroxynitrate thus prepared may be 50 to 200 nm, preferably 100 to 150 nm. As the particle diameter decreases within this range, it is suitable as a positive electrode material for the lithium secondary battery. If the particle diameter exceeds the above range, the particle diameter may be too large to be suitable as an additive for the positive electrode of the lithium secondary battery. On the other hand, the iron oxyhydroxynitrate prepared by the reaction may be crystalline.

If the iron oxyhydroxynitrate produced by the preparation method as described above is applied to the lithium secondary battery, the performance of the lithium secondary battery can be improved because the lithium polysulfide leached during charging and discharging of the lithium secondary battery can be adsorbed.

Positive Electrode for Lithium Secondary Battery

The present invention provides a positive electrode for a lithium secondary battery, which is improved in the problem of the continuous deterioration of the reactivity of the electrode, the problem of the reduction of the discharging capacity and the like due to the dissolution and shuttle phenomenon of the lithium polysulfide by complementing the disadvantages of the conventional positive electrode for the lithium secondary battery.

Specifically, the present invention provides a positive electrode for a lithium secondary battery comprising an active material, an electrically conductive material and a binder, wherein the positive electrode contains an iron oxyhydroxynitrate represented by the following Formula 1 (wherein the lithium secondary battery can be a lithium-sulfur battery containing sulfur in the positive electrode as the electrode active material).

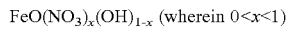
$FeO(NO_3)_x(OH)_{1-x}$ (wherein 0<x<1) [Formula 1]

In particular, the iron oxyhydroxynitrate is contained in the positive electrode for the lithium secondary battery in the present invention to adsorb the lithium polysulfide, thereby being capable of reducing the problem that the lithium polysulfide is transferred to the negative electrode and thus reduce the lifetime of the lithium secondary battery, and to inhibit the decrease in reactivity due to the lithium polysulfide, thereby increasing the discharging capacity of the lithium secondary battery comprising the positive electrode and improving the lifetime of the battery.

The positive electrode for the lithium secondary battery may comprise a current collector and an electrode active material layer formed on at least one side of the current collector, and the electrode active material layer may comprise a base solid material containing an active material, an electrically conductive material, and a binder. As the current collector, it is preferable to use aluminum, nickel or the like having excellent conductivity.

In one embodiment, the iron oxyhydroxynitrate represented by the above Formula 1 may be contained in an amount of 0.1 to 15 parts by weight, specifically, 1 to 15 parts by weight, preferably 5 to 10 parts by weight based on 100 parts by weight of the base solid material containing the active material, the electrically conductive material, and the binder. If the content is less than the lower limit value of the above-mentioned numerical range, the adsorption effect for the polysulfide may be insignificant. If the content exceeds the upper limit value, the capacity of the electrode is reduced, which is not preferable. As an iron oxyhydroxynitrate, the iron oxyhydroxynitrate prepared by the present invention can be used.

The active material in the base solid material constituting the positive electrode of the present invention may comprise elemental sulfur ($S_8$), a sulfur-based compound, or a mixture thereof, and the sulfur-based compound may specifically be $Li_2S_n (n \geq 1)$, an organic sulfur compound or a carbon-sulfur polymer $((C_2S_x)_n: x=2.5 \text{ to } 50, n \geq 2)$.

The positive electrode for the lithium secondary battery according to the present invention may preferably comprise an active material of sulfur-carbon composite, and sulfur alone is not electrically conductive and thus can be used in combination with an electrically conductive material. The addition of the iron oxyhydroxynitrate according to the present invention does not affect the maintenance of this sulfur-carbon composite structure.

In one embodiment, the sulfur-carbon composite may contain 60 to 80 parts by weight of sulfur, preferably 70 to 75 parts by weight of sulfur, based on 100 parts by weight of the sulfur-carbon composite. If the sulfur content is less than 60 parts by weight, the content of the carbon material of the sulfur-carbon composite relatively increases, and the specific surface area increases with the increase of the carbon content, and thus when preparing the slurry, the addition amount of the binder must be increased. The increase in the addition amount of the binder may eventually increase the sheet resistance of the electrode, and thus may act as an insulator to prevent electron pass, thereby deteriorating the performance of the battery. If the sulfur content exceeds 80 parts by weight, sulfur or sulfur compounds that are not associated with the carbon material agglomerate with each other or are re-leached to the surface of the carbon material, and thus may be difficult to receive electrons, thereby being difficult to participate directly in electrode reactions. Therefore, the sulfur content is properly adjusted within the above range.

The carbon of the sulfur-carbon composite according to the present invention may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon, and its shape can be used without restriction as long as it is commonly used in the lithium secondary battery in the form of sphere, rod, needle, plate, tube, or bulk.

The active material may be preferably used in an amount of 50 to 95 parts by weight, more preferably about 70 parts by weight, based on 100 parts by weight of the base solid material. If the active material is comprised in an amount less than the above range, the reaction of the electrode is difficult to be sufficiently exerted. Even if the active material is comprised in an amount more than the above range, the content of other electrically conductive materials and binders is relatively insufficient and it is difficult to exhibit sufficient electrode reaction. Therefore, it is preferable to determine an appropriate content within the above range.

Among the base solid materials constituting the positive electrode of the present invention, the electrically conductive material is a material that electrically connects an electrolyte to a positive electrode active material and serves as a path through which electrons move from the current collector to the sulfur, and is not particularly limited as long as it has porosity and conductivity without causing chemical changes in the battery. For example, graphite-based materials such as KS6; carbon blacks such as Super P, carbon black, Denka black, acetylene black, Ketjen black, channel black, furnace black, lamp black, and thermal black; carbon derivatives such as fullerene; electrically conductive fibers such as carbon fiber and metal fiber; carbon fluoride; metal powders such as aluminum and nickel powder; or electrically conductive polymers such as polyaniline, polythiofene, polyacetylene, and polypyrrole are used alone or in combination.

The electrically conductive material may be preferably used in an amount of 1 to 10 parts by weight, preferably about 5 parts by weight, based on 100 parts by weight of base solid materials. If the content of the electrically conductive material contained in the electrode is less than the above range, the unreacted portion of the sulfur in the electrode is increased and eventually the capacity is reduced. If the content exceeds the above range, the high efficiency discharging characteristic and the charging/discharging cycle life are adversely affected. Therefore, it is desirable to determine the appropriate content within the above-mentioned range.

The binder as a base solid material is a material that is comprised to cause a slurry composition of the base solid material that forms a positive electrode to adhere well to the current collector, which is a substance which is well dissolved in a solvent and which can constitute an electrically conductive network between a positive electrode active material and an electrically conductive material. Unless otherwise specified, all binders known in the art can be used, and preferably poly(vinyl)acetate, polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride (PVdF), polyhexafluoropropylene, copolymer (product name: Kynar) of polyvinylidene fluoride, poly(ethyl acrylate), polyvinylchloride, polytetrafluoroethylene, polyacrylonitrile, polyvinylpyridine, polystyrene, carboxy methyl cellulose, siloxane-based binder such as polydimethylsiloxane, rubber-based binder comprising styrene-butadiene rubber, acrylonitrile-butadiene rubber and styrene-isoprene rubber, ethyleneglycol-based binder such as polyethylene glycol diacrylate and derivatives thereof, blends thereof, and copolymers thereof may be used, but the present invention is not limited thereto.

The binder may be used in an amount of 1 to 10 parts by weight, preferably about 5 parts by weight, based on 100 parts by weight of the base composition contained in the electrode. If the content of the binder resin is less than the above range, the physical properties of the positive electrode are degraded, and thus the positive electrode active material and the electrically conductive material can be dropped off. If the content of the binder resin exceeds the above range, the ratio of the active material and the electrically conductive material in the positive electrode may be relatively decreased, thereby reducing the battery capacity. Therefore, it is preferable that the content of the binder resin is determined from the appropriate content within the above-mentioned range.

As described above, the positive electrode comprising the iron oxyhydroxynitrate and base solid materials can be prepared by conventional methods. For example, to a positive electrode active material, a solvent, and if necessary, a binder, an electrically conductive material, and a dispersant were mixed and stirred to prepare a slurry. Then, the prepared slurry can be applied (coated) on a current collector of a metal material, compressed, and then dried to produce a positive electrode.

For example, in preparing the positive electrode slurry, first, after the iron oxyhydroxynitrate is dispersed in a solvent, the obtained solution is mixed with an active material, an electrically conductive material, and a binder to obtain a slurry composition for forming a positive electrode. Thereafter, this slurry composition is coated on a current collector and dried to complete a positive electrode. At this time, if necessary, the electrode can be manufactured by compression-molding on the current collector to improve the density of the electrode. There are no limitations on the method of coating the slurry. For example, it is possible to use a coating method such as doctor blade coating, dip coating, gravure coating, slit die coating, spin coating, comma coating, bar coating, reverse roll coating, screen coating, cap coating and the like.

At this time, a solvent capable of not only uniformly dispersing a positive electrode active material, a binder and an electrically conductive material but also easily dispersing the iron oxyhydroxynitrate can be used as the solvent. As such a solvent, water is most preferable as an aqueous solvent, and the water may be double distilled water (DW) or triple distilled deionized water (DIW), but is not necessarily limited thereto, and if necessary, a lower alcohol which can be easily mixed with water may be used. Examples of the lower alcohol comprise methanol, ethanol, propanol, isopropanol, and butanol, and they may be preferably used in mixture with water.

Lithium Secondary Battery

The present invention provides a lithium secondary battery comprising a positive electrode for lithium secondary battery, a negative electrode, a separator interposed therebetween, and an electrolyte. At this time, the negative electrode, separator, and electrolyte may be made of conventional materials that can be used in a lithium secondary battery.

Specifically, the negative electrode may comprise a material capable of reversibly intercalating or deintercalating lithium ion ($Li^+$), a material capable of reacting with lithium ion to reversibly form a lithium-containing compound, lithium metal or a lithium alloy as an active material.

The material capable of reversibly intercalating or deintercalating lithium ion (Li$^+$) may be, for example, crystalline carbon, amorphous carbon, or mixtures thereof. In addition, the material capable of reacting with lithium ion (Li$^+$) to reversibly form the lithium-containing compound may be, for example, tin oxide, titanium nitrate or silicon. In addition, the lithium alloy may be, for example, an alloy of lithium and the metal selected from the group consisting of Na, K, Rb, Cs, Fr, Be, Mg, Ca, Sr, Ba, Ra, Al and Sn.

In addition, the negative electrode may further optionally comprise a binder together with a negative electrode active material. The binder acts to cause negative electrode active materials to become a paste and create mutual adhesion between the active materials, adhesion between the active materials and the current collector, and buffer effect for the expansion and contraction of the active materials, etc. Specifically, the binder is the same as that described above.

In addition, the negative electrode may further comprise a current collector for supporting a negative electrode active layer comprising a negative electrode active material and a binder. The current collector may be selected from the group consisting of copper, aluminum, stainless steel, titanium, silver, palladium, nickel, alloys thereof, and combinations thereof. The stainless steel may be surface-treated with carbon, nickel, titanium or silver, and an aluminum-cadmium alloy may be used as the alloy. In addition, sintered carbon, a nonconductive polymer surface-treated with an electrically conductive material, or a conductive polymer may be used. In addition, the negative electrode may be a thin film of lithium metal.

As the separator, a material capable of separating or insulating the positive electrode and the negative electrode from each other while allowing the lithium ion to be transported therebetween is used. The separator can be used as a separator without any particular limitations as long as it is used as a separator in the lithium secondary battery. Particularly, it is desirable to use a separator having excellent wettability to the electrolyte while having low resistance to ion migration of the electrolyte.

More preferably, as the material for the separator, a porous, nonconductive or insulating material can be used, and for example, the separator may be an independent member such as a film, or may comprise a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

The electrolyte is a non-aqueous electrolyte containing lithium salt and is composed of lithium salt and an electrolyte solution, and as the electrolyte solution, non-aqueous organic solvent, organic solid electrolyte and inorganic solid electrolyte are used.

The lithium salt is a substance which can be easily dissolved in a non-aqueous organic solvent, and for example, may be at least one selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, lithium chloroborane, lithium lower aliphatic carboxylate, and lithium imide.

The concentration of the lithium salt may be 0.2 to 2 M, preferably 0.6 to 2 M, more preferably 0.7 to 1.7 M depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than the above range, the conductivity of the electrolyte may be lowered and thus the performance of the electrolyte may be deteriorated. If the concentration of the lithium salt exceeds the above range, the viscosity of the electrolyte may increase and thus the mobility of the lithium ion (Li$^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethylcarbonate (DMC), diethylcarbonate (DEC), ethylmethylcarbonate (EMC), methylpropylcarbonate (MPC), ethylpropylcarbonate, dipropylcarbonate, butylethylcarbonate, ethylpropanoate (EP), toluene, xylene, dimethyl ether (DME), diethylether, triethylene glycol monomethyl ether (TEGME), diglyme, tetraglyme, hexamethyl phosphoric triamide, gamma-butyrolactone (GBL), acetonitrile, propionitrile, ethylenecarbonate (EC), propylenecarbonate (PC), N-methylpyrrolidone, 3-methyl-2-oxazolidone, acetic acid ester, butyric acid ester and propionic acid ester, dimethyl formamide, sulfolane (SL), methyl sulfolane, dimethyl acetamide, dimethyl sulfoxide, dimethyl sulfate, ethyleneglycol di-acetate, dimethyl sulfite, or ethyleneglycol sulfite can be used alone or in a mixed solvent form of two or more solvents thereof.

As the organic solid electrolyte, preferably, polyethylene derivatives, polyethylene oxide derivatives, polypropylene oxide derivatives, phosphate ester polymers, poly alginate lysine, polyester sulfide, polyvinyl alcohol, polyvinylidene fluoride, and polymers comprising ionic dissociation groups and the like can be used.

As the inorganic solid electrolyte of the present invention, preferably, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be preferably used.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed in a battery case. Thereafter, a lithium secondary battery is manufactured by injecting an electrolyte solution into the upper part of the case and sealing it with a cap plate and a gasket.

The lithium secondary battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium secondary battery according to the present invention constituted as described above comprises the iron oxyhydroxynitrate to adsorb the lithium polysulfide generated during charging and discharging of the lithium secondary battery, thereby increasing the reactivity of the positive electrode of the lithium secondary battery, and increasing the discharging capacity and lifetime of the lithium secondary battery.

Hereinafter, the present invention will be described in more detail with reference to Examples and the like. However, the scope and content of the present invention cannot be construed as narrowing down or limiting the invention by Examples and the like. Also, it will be apparent on the basis of the disclosures of the present invention, comprising the following Examples that the present invention, in which experimental results are not specifically shown, can be easily carried out by those skilled in the art and that such modifications and variations are intended to fall within the scope of the appended claims.

Example 1: Preparation of Iron Oxyhydroxynitrate 75 g of $Fe(NO_3)_3 \cdot 9H_2O$ (Sigma-Aldrich Company) was dissolved in the mixed solvent of 50 g of DIW (deionized water) and 50 g of ethanol to prepare a 1.8 M solution. The prepared solution was placed in a glass bath and sufficiently dried in a convection oven at 80° C. for 24 hours to obtain an iron oxyhydroxynitrate having the formula $FeO(NO_3)_x(OH)_{1-x}$ (wherein $0.5 \leq x < 1$).

Comparative Example 1: Preparation of Iron Oxyhydroxynitrate

An iron oxyhydroxynitrate was prepared in the same manner as in Example 1, except that 100 g of ethanol instead of the mixed solvent was used to prepare an iron oxyhydroxynitrate solution.

Comparative Example 2: Preparation of Iron Oxyhydroxynitrate

An iron oxyhydroxynitrate was prepared in the same manner as in Example 1, except that 100 g of deionized water (DIW) instead of the mixed solvent was used to prepare an iron oxyhydroxynitrate solution.

Comparative Example 3: Preparation of Iron Oxyhydroxynitrate

An iron oxyhydroxynitrate was prepared in the same manner as in Example 1, except that the drying temperature was changed to 155° C.

Experimental Example 1: Scanning Electron Microscope (SEM) Analysis

Figure 2:
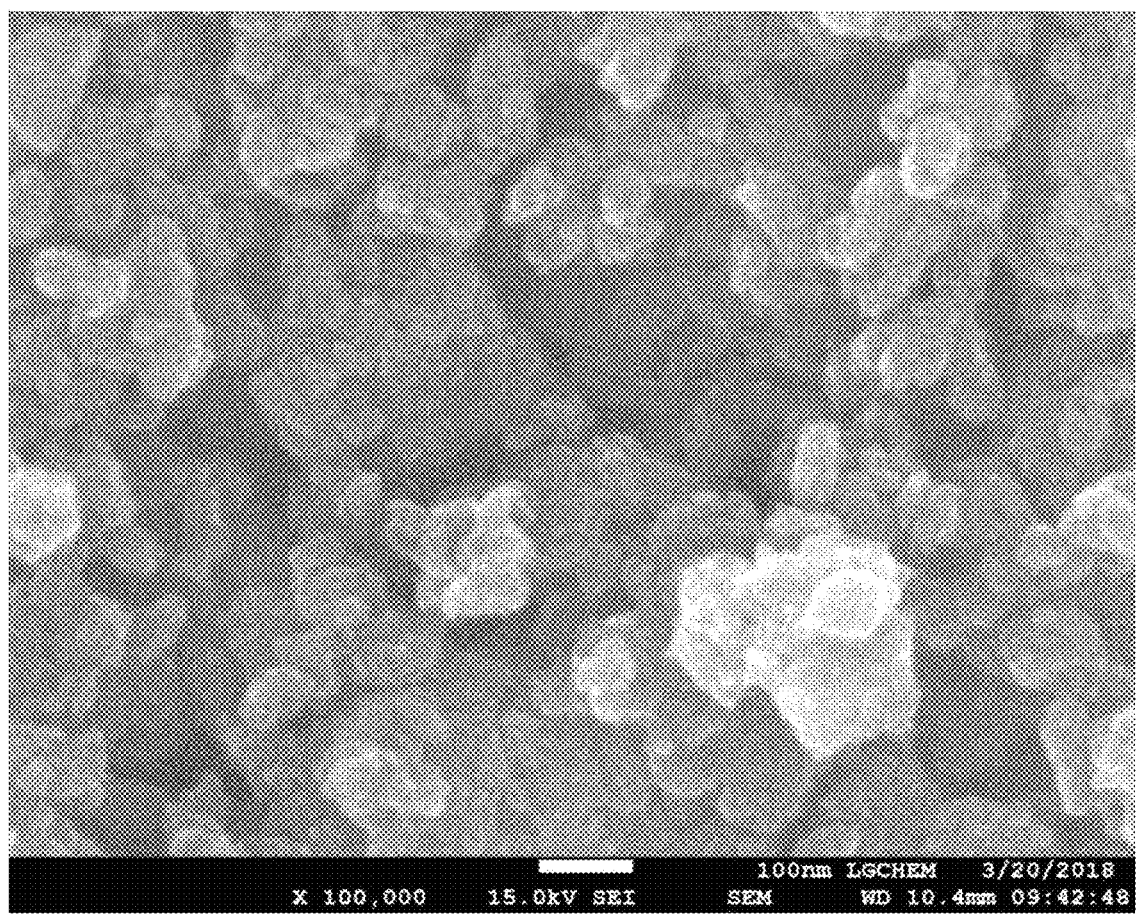
FIG. 2 shows a scanning electron microscope (SEM) image of the particles ($\alpha$-Fe$_2$O$_3$+$\alpha$-FeOOH) prepared according to Comparative Example 3 of the present invention.

SEM analysis (S-4800 FE-SEM of Hitachi Company) was performed for the iron oxyhydroxynitrate ($FeO(NO_3)_x(OH)_{1-x}$) prepared in Example 1 and the particles ($\alpha$-$Fe_2O_3$+$\alpha$-FeOOH) prepared in Comparative Example 3 above. FIG. 1 shows the results of SEM analysis of the iron oxyhydroxynitrate prepared in Example 1 ((a) in FIG. 1 is a magnification of 5 k, and (b) in FIG. 1 is a magnification of 100 k), and FIG. 2 is a graph showing the results of SEM analysis of the particles prepared in Comparative Example 3. As a result of SEM analysis at a magnification of 100 k, the particles having particle diameter of 50 to 200 nm were identified as shown in FIGS. 1 and 2, respectively.

Experimental Example 2: X-Ray Diffraction (XRD) Analysis

Figure 3:
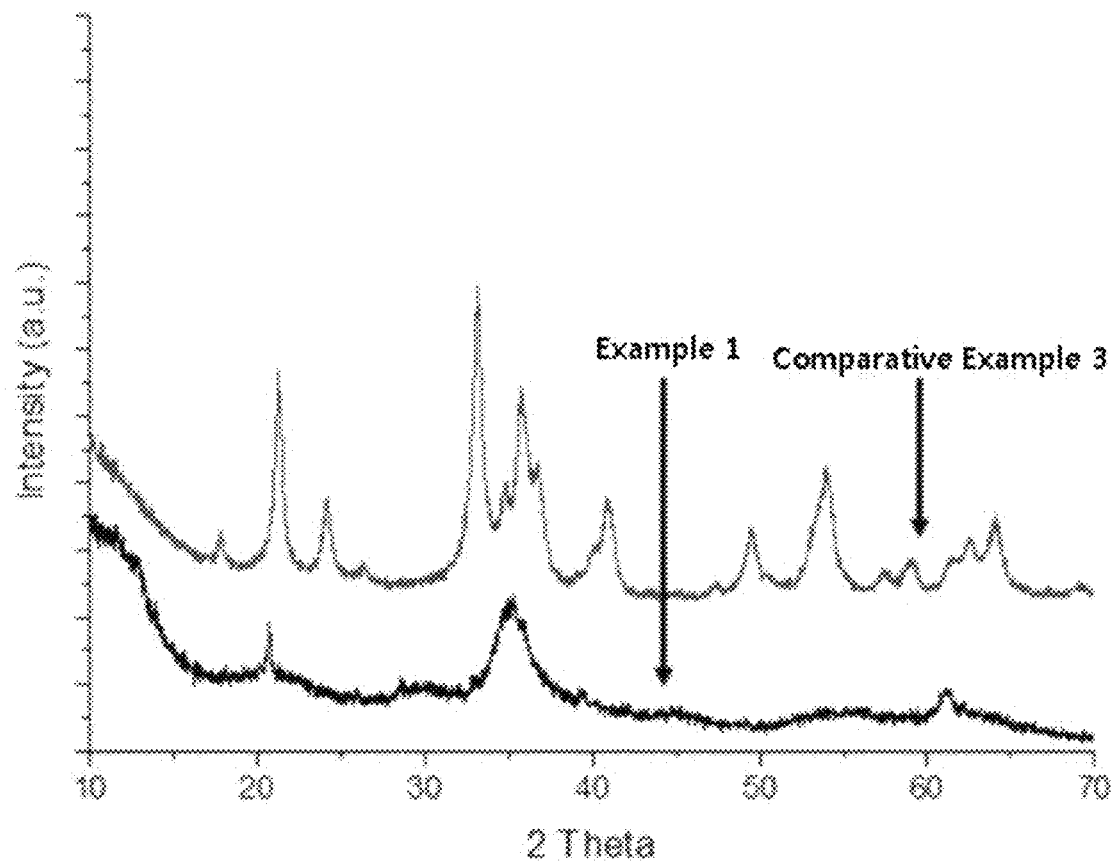
FIG. 3 shows the results of X-ray diffraction (XRD) of iron oxyhydroxynitrate (FeO(NO$_3$)$_x$(OH)$_{1-x}$) prepared in Example 1 of the present invention and the particles ($\alpha$-Fe$_2$O$_3$+$\alpha$-FeOOH) prepared in Comparative Example 3.

XRD analysis (D4 Endeavor from Bruker Company) was performed on the materials prepared, respectively, in Example 1 and Comparative Example 3. FIG. 3 shows the results of X-ray diffraction analysis of the iron oxyhydroxynitrate prepared in Example 1 and the particles prepared in Comparative Example 3 using CuK$\alpha$ line. Referring to FIG. 3, XRD effective peaks of the (310) and (520) planes were $2\theta=35.2\pm0.2°$ and $61.3\pm0.2°$, respectively, confirming that iron oxyhydroxynitrate with a pure phase according to the present invention was prepared.

The significant or effective peak in X-ray diffraction (XRD) refers to a peak that is repeatedly detected in substantially the same pattern without being significantly affected by the analysis conditions or analysts in the XRD data, and in other words, refers to a peak having a height, strength, intensity or the like of at least 1.5 times, preferably at least 2 times, and more preferably at least 2.5 times the background level.

Experimental Example 3: Evaluation of Lithium Polysulfide Adsorption Capacity of Iron Oxyhydroxynitrate The lithium polysulfide adsorption capacities of the materials prepared, respectively, in Example 1 and Comparative Example 3 were confirmed through ultraviolet absorbance analysis (UV, Agilent 8453 UV-visible spectrophotometer from Agilent Company), and the results are shown in FIG. 4.

Figure 4:
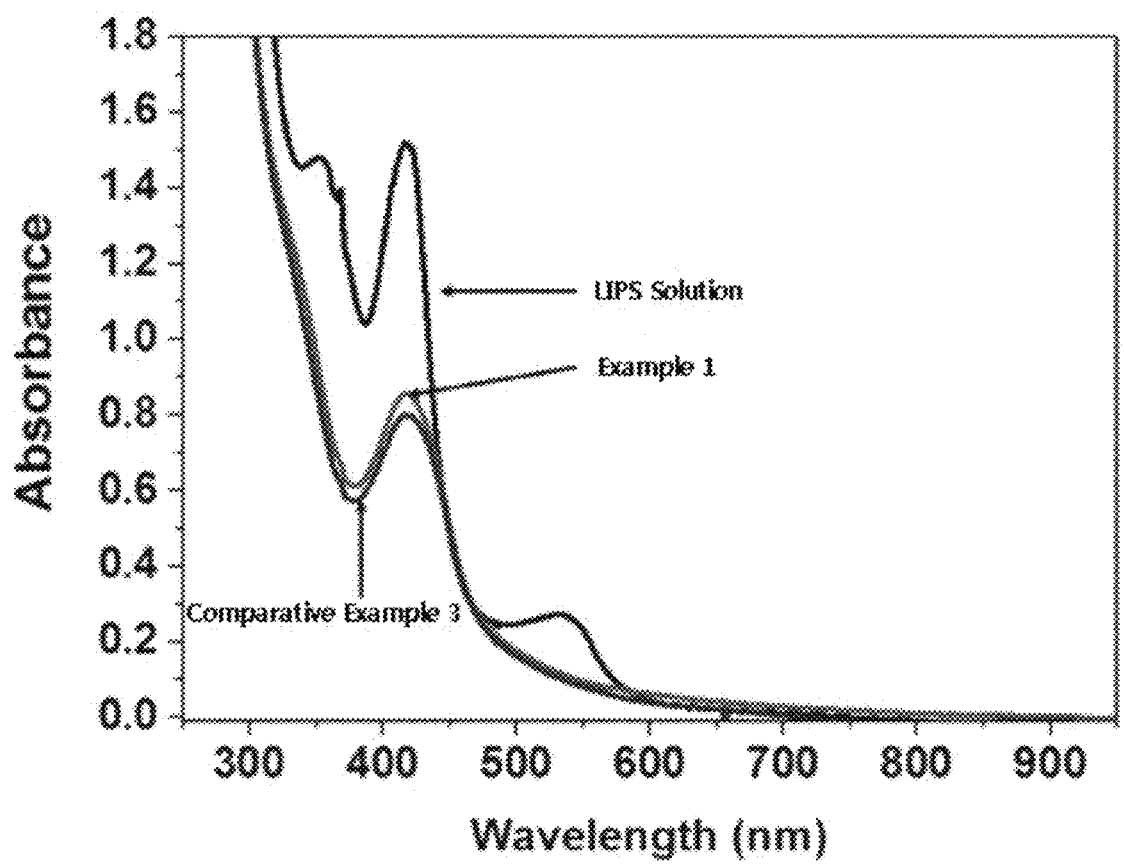
FIG. 4 shows the change in chromaticity of the lithium polysulfide adsorption reaction according to iron oxyhydroxynitrate (FeO(NO$_3$)$_x$(OH)$_{1-x}$) prepared in Example 1 of the present invention and the particles ($\alpha$-Fe$_2$O$_3$+$\alpha$-FeOOH) prepared in Comparative Example 3 as a measurement result of UV absorbance.

As shown in FIG. 4, it was confirmed in the wavelength range of 300 to 950 nm that the materials prepared, respectively, in Example 1 and Comparative Example 3 of the present invention absorbed the lithium polysulfide to reduce the intensity of ultraviolet absorbance, and thus it was found that the iron oxyhydroxynitrate according to the present invention adsorbs the lithium polysulfide well.

Experimental Example 4: Evaluation of Discharging Capacity of Lithium Secondary Battery In order to test the discharging capacities of the lithium secondary batteries (accurately, the lithium-sulfur batteries) according to the type of the positive electrode material, the discharging capacities were measured after constructing the positive electrodes and the negative electrodes for the lithium secondary batteries as shown in Table 1 below.

The positive electrode of Experimental Example 1 was constructed to comprise the sulfur-carbon composites and the iron oxyhydroxynitrate of Example 1, the positive electrode of Comparative Experimental Example 1 was constructed to comprise the sulfur-carbon composites, and the positive electrode of Comparative Experimental Example 2 was constructed to comprise the sulfur-carbon composites and iron oxyhydroxynitrate prepared in Comparative Example 1. The positive electrode of Comparative Experimental Example 3 was constructed to comprise the sulfur-carbon composites and iron oxyhydroxynitrate prepared in Comparative Example 2, and the positive electrode of Comparative Experimental Example 4 was constructed to comprise the sulfur-carbon composites and the particles prepared in Comparative Example 3. The sulfur/carbon ratio of the sulfur-carbon composite used as the positive electrode active material in Table 1 was 70:30, the measurement current was 0.1 C, the voltage range was 1.8 to 2.5 V, and the results are shown in FIG. 5.

TABLE 1

| | Lithium-sulfur battery | |
|---|---|---|
| | Negative electrode | Positive electrode |
| Experimental Example 1 | Metal lithium | sulfur-carbon composite + electrically conductive material + binder + iron oxyhydroxynitrate of Example 1 (10 parts by weight) (90:5:5:10, weight ratio) |
| Comparative Experimental Example 1 | Metal lithium | sulfur-carbon composite + electrically conductive material + binder (90:5:5, weight ratio) |
| Comparative Experimental Example 2 | Metal lithium | sulfur-carbon composite + electrically conductive material + binder + iron oxyhydroxynitrate of Comparative Example 1 (10 parts by weight) (90:5:5:10, weight ratio) |
| Comparative Experimental Example 3 | Metal lithium | sulfur-carbon composite + electrically conductive material + binder + iron oxyhydroxynitrate of Comparative Example 2 (10 parts by weight) (90:5:5:10, weight ratio) |
| Comparative Experimental Example 4 | Metal lithium | sulfur-carbon composite + electrically conductive material + binder + material of Comparative Example 3 (10 parts by weight) (90:5:5:10, weight ratio) |

Figure 5:
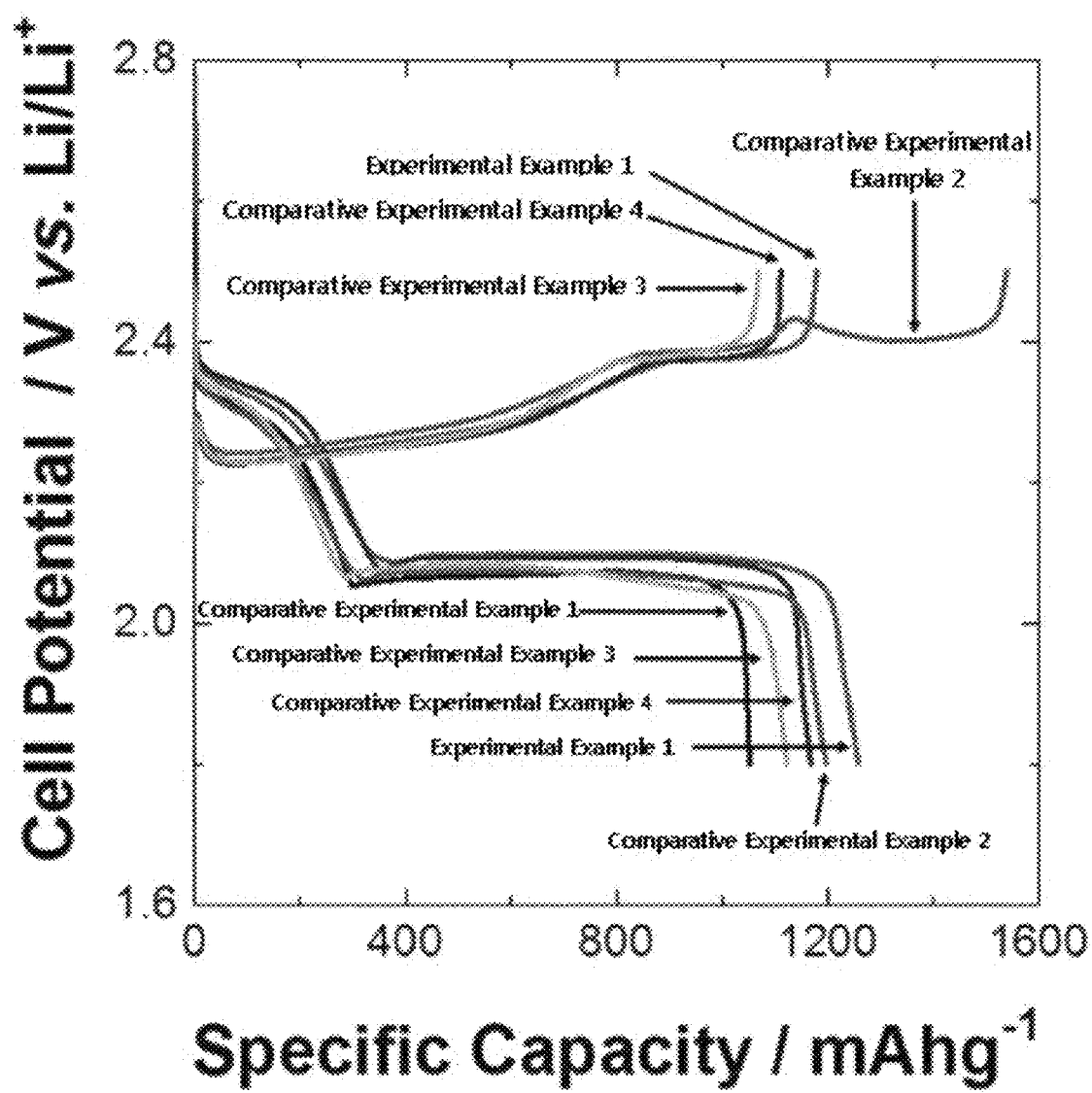
FIG. 5 shows the measurement results of the discharging capacities of the lithium secondary batteries containing the materials according to the Examples of the present invention and the Comparative Examples as an additive for a positive electrode.

As shown in FIG. 5, in the case of Experimental Example 1, it was confirmed that the discharging capacity and over-voltage improvement effect were improved as compared with Comparative Experimental Examples 1 to 4, and thus it was found that the iron oxyhydroxynitrate according to the present invention improves the over-voltage of the positive electrode of the lithium-sulfur battery and is effective in increasing the discharging capacity of the battery. In the case of Comparative Experimental Example 2, as a result of the preparation of iron oxyhydroxynitrate using only ethanol instead of the mixed solvent, it was confirmed that the overcharge phenomenon of the battery occurred and it was difficult to apply it to the lithium-sulfur battery. In the case of Comparative Experimental Example 3, as a result of the preparation of iron oxyhydroxynitrate using only DIW (de-ionized water) instead of the mixed solvent, it was confirmed that the discharging capacity of the battery was remarkably reduced, and thus it was found that the performance improvement effect of the lithium-sulfur battery including this is insufficient and the effect on the increase of the energy density is low.

Figure 6:
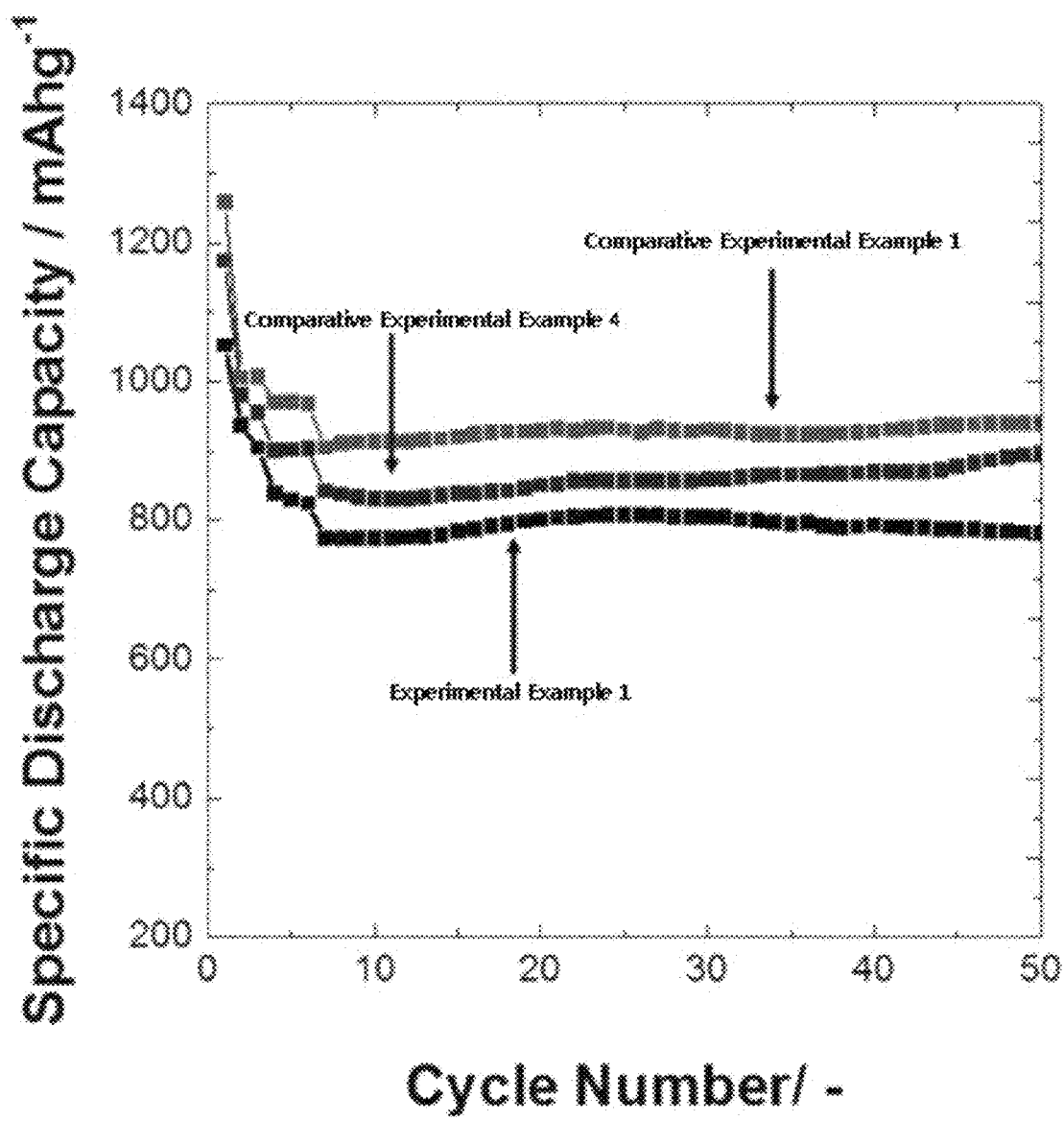
FIG. 6 shows the measurement results of the lifetime characteristics of the lithium secondary batteries containing the materials according to the Examples of the present invention and the Comparative Examples as an additive for a positive electrode.

Experimental Example 5: Evaluation of Lifetime Characteristic of Lithium Secondary Battery After constructing the positive electrodes and the negative electrodes for lithium secondary batteries (exactly, lithium-sulfur batteries) as shown in Table 1 above, the lifetime characteristics according to the cycle of the batteries were measured, and the results are shown in FIG. 6. The measurement was carried out by repeating 0.1 C discharging/0.1 C charging of 3 cycles, 0.2 C discharging/0.2 C charging of 3 cycles, and then 0.5 C discharging/0.3 C charging in the voltage range of 1.8 to 2.5V.

In the case of the battery according to Experimental Example 1, it was confirmed that the higher discharge capacity as compared with Comparative Experimental Example 1 and Comparative Experimental Example 4 was obtained even when the C-rate was increased. As a result, it was found that in the case of the lithium secondary battery containing iron oxyhydroxynitrate according to the present invention in the positive electrode, the lifetime characteristics depending on the cycles were excellent.

Example 2: Manufacture of Lithium Secondary Battery Comprising Positive Electrode to which Iron Oxyhydroxynitrate was Added (1)

First, on the basis of the total weight (100 parts by weight) of the base solid material (the active material, the electrically conductive material and the binder) to which iron oxyhydroxynitrate is added, 10 parts by weight of iron oxyhydroxynitrate prepared in Example 1 was added and dissolved in water as a solvent. Thereafter, 100 parts by weight of the base solid material relative to the obtained solution, that is, 90 parts by weight of sulfur-carbon composite (S/C 70:30 parts by weight) as an active material, 5 parts by weight of Denka black as an electrically conductive material, and 5 parts by weight of styrene butadiene rubber/carboxymethyl cellulose (SBR/CMC 7:3) as a binder were added and mixed to prepare a slurry composition for positive electrode.

Subsequently, the slurry composition prepared above was coated on a current collector (Al foil), dried at 50° C. for 12 hours, and pressed with a roll press machine to produce a positive electrode. At this time, the loading amount was set to 3.5 mAh/cm$^2$, and the porosity of the electrode was set to 65%.

Thereafter, a lithium secondary battery (coin cell) comprising the positive electrode prepared as described above, a negative electrode, a separator, and an electrolyte solution was manufactured as follows. Specifically, the positive electrode was fabricated by punching into a 14-phi circular electrode, the polyethylene (PE) separator was fabricated by punching into a separator of 19 phi and the negative electrode was fabricated by punching lithium metal of 150 um into 16 phi.

Example 3: Manufacture of Lithium Secondary Battery Comprising Positive Electrode to which Iron Oxyhydroxynitrate was Added (2)

A lithium secondary battery (coin cell) was manufactured in the same manner as in Example 2 above, except that the ratio of sulfur to carbon (S/C) of the sulfur-carbon composite is changed to 75:25, and the input amount of iron oxyhydroxynitrate is changed to 1 part by weight relative to the base solid material.

Example 4: Manufacture of Lithium Secondary Battery Comprising Positive Electrode to which Iron Oxyhydroxynitrate was Added (3)

A lithium secondary battery (coin cell) was manufactured in the same manner as in Example 2 above, except that the ratio of sulfur to carbon (S/C) of the sulfur-carbon composite is changed to 75:25, and the input amount of iron oxyhydroxynitrate is changed to 3 parts by weight relative to the base solid material.

Example 5: Manufacture of Lithium Secondary Battery Comprising Positive Electrode to which Iron Oxyhydroxynitrate was Added (4)

A lithium secondary battery (coin cell) was manufactured in the same manner as in Example 2 above, except that the ratio of sulfur to carbon (S/C) of the sulfur-carbon composite is changed to 75:25, and the input amount of iron oxyhydroxynitrate is changed to 5 parts by weight relative to the base solid material.

Comparative Example 4: Manufacture of Lithium Secondary Battery Comprising Positive Electrode to which Iron Oxyhydroxynitrate was not Added (1)

To water as a solvent, 100 parts by weight of the base solid material, that is, 90 parts by weight of the sulfur-carbon composite (S/C 70:30 parts by weight) as an active material, 5 parts by weight of Denka black as an electrically conductive material, and 5 parts by weight of styrene butadiene rubber/carboxymethyl cellulose (SBR/CMC 7:3) as a binder were added and mixed to prepare a slurry composition for positive electrode.

Subsequently, the slurry composition prepared above was coated on a current collector (Al foil), dried at 50° C. for 12 hours to produce a positive electrode. At this time, the loading amount was set to 3.5 mAh/cm$^2$, and the porosity of the electrode was set to 60%.

Thereafter, a lithium secondary battery (coin cell) comprising the positive electrode prepared as described above, a negative electrode, a separator, and an electrolyte solution was manufactured as follows. Specifically, the positive electrode was fabricated by punching into a 14-phi circular electrode, the polyethylene (PE) separator was fabricated by punching into a separator of 19 phi and the negative electrode was fabricated by punching lithium metal of 150 um into 16 phi.

Comparative Example 5: Manufacture of Lithium Secondary Battery Comprising Positive Electrode to which Iron Oxyhydroxynitrate was not Added (2)

A lithium secondary battery (coin cell) was manufactured in the same manner as in Comparative Example 4 above, except that the ratio of sulfur carbon (S/C) of the sulfur-carbon composite is changed to 75:25.

Experimental Example 6: Comparison Test of Discharging Capacity of Lithium Secondary Battery In order to test the discharging capacity of the lithium secondary battery depending on the type of the positive electrode material, the discharging capacities were measured after constructing the positive electrodes and the negative electrodes for lithium secondary batteries as shown in Table 2 below. At this time, the measurement current was set to 0.1 C, the voltage range was set to 1.8 to 2.5 V, and the results are shown in FIGS. 5 and 6.

TABLE 2

| | Lithium secondary battery | |
|---|---|---|
| | Negative electrode | Positive electrode |
| Comparative Example 4 | Metal lithium | sulfur-carbon composite (S/C 70:30) + electrically conductive material + binder (90:5:5, weight ratio) |
| Comparative Example 5 | Metal lithium | sulfur-carbon composite (S/C 75:25) + electrically conductive material + binder (90:5:5, weight ratio) |
| Example 2 | Metal lithium | sulfur-carbon composite (S/C 70:30) + electrically conductive material + binder + iron oxyhydroxynitrate of Example 1 (10 parts by weight) (90:5:5:10, weight ratio) |
| Example 3 | Metal lithium | sulfur-carbon composite (S/C 75:25) + electrically conductive material + binder + iron oxyhydroxynitrate of Example 1 (1 part by weight) (90:5:5:1, weight ratio) |
| Example 4 | Metal lithium | sulfur-carbon composite (S/C 75:25) + electrically conductive material + binder + iron oxyhydroxynitrate of Example 1 (3 parts by weight) (90:5:5:3, weight ratio) |
| Example 5 | Metal lithium | sulfur-carbon composite (S/C 75:25) + electrically conductive material + binder + iron oxyhydroxynitrate Example 1 (5 parts by weight) (90:5:5:5, weight ratio) |

Figure 7:
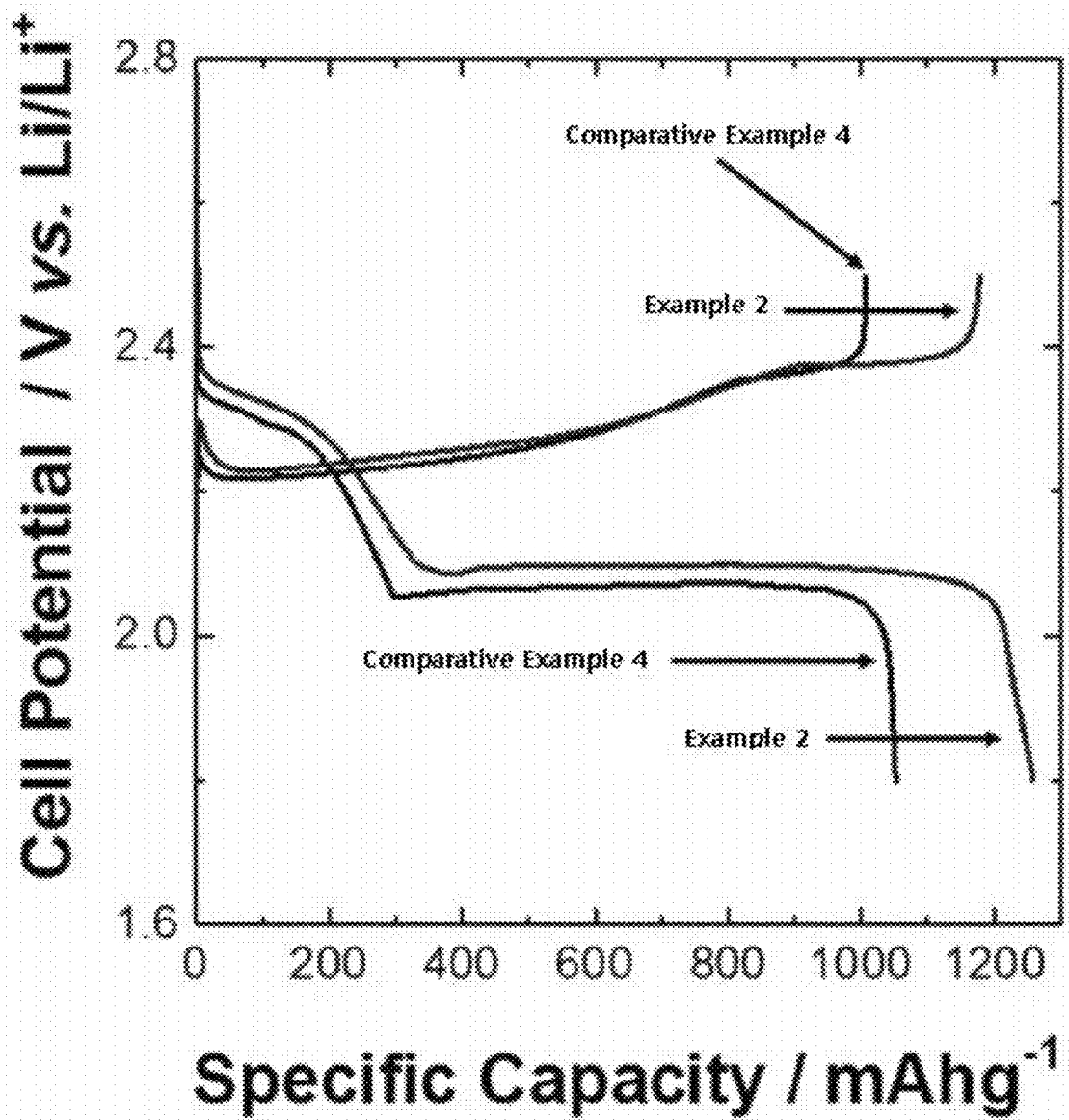
FIGS. 7 and 8 show the measurement results of the initial discharging capacities of the lithium secondary batteries containing the positive electrode according to the Examples of the present invention and the Comparative Examples of the present invention.
Figure 8:
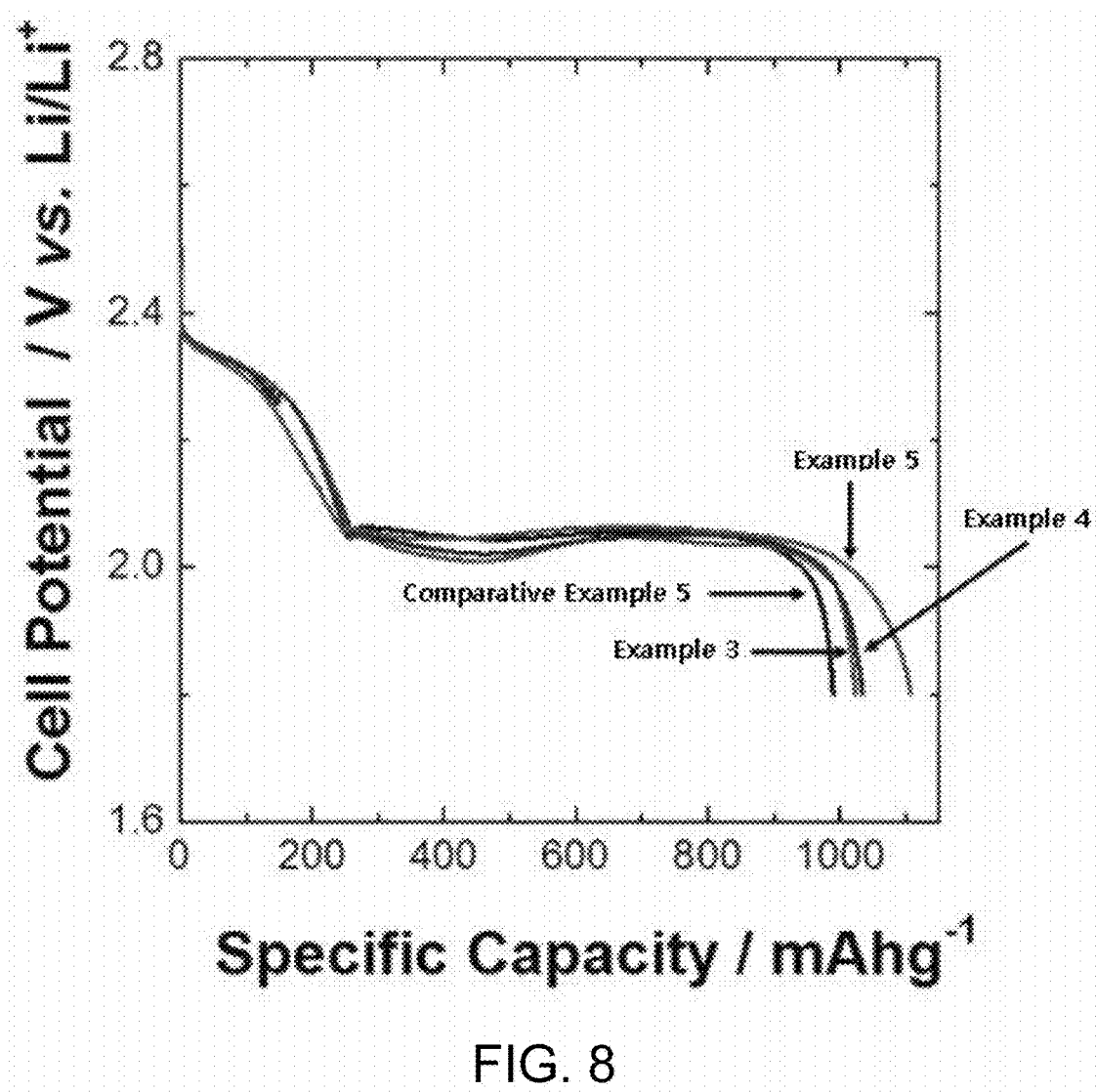

As shown in FIG. 7, it was confirmed that in the case of the battery according to Example 2 containing iron oxyhydroxynitrate, the overvoltage of the battery was improved and the discharging capacity was further increased as compared with Comparative Example 4. Especially, as shown in FIG. 8. in the case of Comparative Example 5 using the sulfur-carbon composite having a sulfur content of 75 parts by weight, the initial discharging was not properly performed due to an increase in the content of sulfur, an insulator, and thus the discharging capacity of the battery was reduced due to the occurrence of large overvoltage. However, in the case of containing iron oxyhydroxynitrate according to the present invention, it was confirmed that the discharging capacity was increased even though the sulfur-carbon composite having a sulfur content of 75 parts by weight was used. In particular, it was found that in the case of Example 5, which contains 5 parts by weight of iron oxyhydroxynitrate, the energy density of the lithium secondary battery can be increased. Therefore, it was found that the iron oxyhydroxynitrate according to the present invention is effective in increasing the initial discharging capacity of the lithium secondary battery.

The invention claimed is:

1. A positive electrode for a lithium secondary battery comprising:
   an iron oxyhydroxynitrate represented by the following Formula 1:

$FeO(NO_3)_x(OH)_{1-x}$, wherein 0<x<1.   [Formula 1]

2. The positive electrode for the lithium secondary battery according to claim 1, wherein a content of the iron oxyhydroxynitrate is 0.1 parts by weight to 15 parts by weight relative to 100 parts by weight of a base solid material comprising an active material, an electrically conductive material and a binder contained in the positive electrode for the lithium secondary battery.

3. The positive electrode for the lithium secondary battery according to claim 1, wherein the iron oxyhydroxynitrate is in a form of particles having a particle diameter of 50 nm to 200 nm.

4. The positive electrode for the lithium secondary battery according to claim 1, wherein the iron oxyhydroxynitrate is crystalline.

5. The positive electrode for the lithium secondary battery according to claim 1, wherein the iron oxyhydroxynitrate shows X-ray diffraction (XRD) peaks of planes (310) and (520) at 2θ=35.2±0.2° and 61.3±0.2°, respectively.

6. The positive electrode for the lithium secondary battery according to claim 1, further comprising an active material, an electrically conductive material, and a binder, wherein the active material comprises a sulfur-carbon composite.

7. The positive electrode for the lithium secondary battery according to claim 6, wherein the sulfur-carbon composite has a sulfur content of 60 parts by weight to 80 parts by weight based on 100 parts by weight of the sulfur-carbon composite.

8. A method for preparing an iron oxyhydroxynitrate comprising:
(1) dissolving $Fe(NO_3)_3 \cdot 9H_2O$ in a mixed solvent comprising an aqueous solvent and an organic solvent to prepare a $Fe(NO_3)_3 \cdot 9H_2O$ solution; and
(2) drying the $Fe(NO_3)_3 \cdot 9H_2O$ solution to obtain a compound represented by the following Formula 1:

$FeO(NO_3)_x(OH)_{1-x}$, wherein $0<x<1$. [Formula 1]

wherein the drying is carried out at a temperature of 70° C. to 90° C. for 18 hours to 36 hours.

9. The method for preparing the iron oxyhydroxynitrate according to claim 8, wherein a concentration of the $Fe(NO_3)_3 \cdot 9H_2O$ solution in step (1) is 0.5 M to 2.5 M.

10. The method for preparing the iron oxyhydroxynitrate according to claim 8, wherein the aqueous solvent and the organic solvent are mixed at a weight ratio of 30:70 to 70:30.

11. The method for preparing the iron oxyhydroxynitrate according to claim 8, wherein the iron oxyhydroxynitrate is in a form of particles having a particle diameter of 50 nm to 200 nm.

12. A lithium secondary battery comprising: the positive electrode for the lithium secondary battery of claim 1; a negative electrode; a separator interposed therebetween; and an electrolyte.

13. The lithium secondary battery according to claim 12, wherein the positive electrode comprises sulfur.

* * * * *